United States Patent
Xu et al.

(10) Patent No.: US 10,869,068 B2
(45) Date of Patent: Dec. 15, 2020

(54) METHOD AND DEVICE FOR PUSHING ADVERTISEMENT, AND COMPUTER-READABLE STORAGE MEDIUM

(71) Applicant: SHENZHEN SKYWORTH-RGB ELECTRONIC CO., LTD., Guangdong (CN)

(72) Inventors: Yaoling Xu, Guangdong (CN); Wensheng Hong, Guangdong (CN)

(73) Assignee: SHENZHEN SKYWORTH-RGB ELECTRONIC CO., LTD., Shenzhen (CN)

(*) Notice: Subject to any disclaimer, the term of this patent is extended or adjusted under 35 U.S.C. 154(b) by 23 days.

(21) Appl. No.: 16/331,136

(22) PCT Filed: Dec. 25, 2017

(86) PCT No.: PCT/CN2017/118333
§ 371 (c)(1),
(2) Date: Mar. 6, 2019

(87) PCT Pub. No.: WO2019/010926
PCT Pub. Date: Jan. 17, 2019

(65) Prior Publication Data
US 2019/0238907 A1 Aug. 1, 2019

(30) Foreign Application Priority Data
Jul. 14, 2017 (CN) .......................... 2017 1 0578657

(51) Int. Cl.
*H04N 21/234* (2011.01)
*H04N 21/2668* (2011.01)
(Continued)

(52) U.S. Cl.
CPC ... *H04N 21/23424* (2013.01); *H04N 21/2668* (2013.01); *H04N 21/458* (2013.01);
(Continued)

(58) Field of Classification Search
None
See application file for complete search history.

(56) References Cited

U.S. PATENT DOCUMENTS 7,340,760 B2 * 3/2008 Wachtfogel ............. H04N 5/76
348/E7.063
8,479,228 B1 * 7/2013 Simon ................. H04N 21/2668
725/34
(Continued)

FOREIGN PATENT DOCUMENTS

CN 1275740 A 12/2000
CN 101212304 A 7/2008
(Continued)

OTHER PUBLICATIONS

International search report of PCT Patent Application No. PCT/CN2017/118333 dated Apr. 3, 2018.
(Continued)

*Primary Examiner* — Alexander Q Huerta (57) ABSTRACT

Disclosed a method and a device for pushing advertisement, as well as a computer-readable storage medium, the method includes the terminal of the sends a video acquisition request to the video management platform, and the video management platform acquires a target video frame according to the video acquisition request and sends the target video frame to the advertising platform. The advertising platform generates corresponding advertisements according to the target video frames and sends auxiliary information corresponding to the advertisements to the video management platform; the video management platform sends the auxiliary information and the target video frame to the terminal; the terminal acquires
(Continued)

the advertisement according to the auxiliary information, synthesizes the advertisement with the target video frame and plays the video corresponding to the synthesized target video frame.

9 Claims, 2 Drawing Sheets

(51) Int. Cl.
  *H04N 21/472* (2011.01)
  *H04N 21/458* (2011.01)
  *H04N 21/475* (2011.01)
  *H04N 21/81* (2011.01)
(52) U.S. Cl.
  CPC ....... *H04N 21/472* (2013.01); *H04N 21/4755* (2013.01); *H04N 21/47202* (2013.01); *H04N 21/812* (2013.01)

(56) References Cited

U.S. PATENT DOCUMENTS

| | | | | |
|---|---|---|---|---|
| 9,723,372 | B1* | 8/2017 | McLean | G06Q 30/0277 |
| 2013/0071090 | A1* | 3/2013 | Berkowitz | H04N 21/6582 |
| | | | | 386/248 |
| 2013/0081097 | A1 | 3/2013 | Park et al. | |
| 2014/0196085 | A1* | 7/2014 | Dunker | H04N 21/23424 |
| | | | | 725/36 |
| 2014/0201469 | A1* | 7/2014 | Joshua | G06F 12/0804 |
| | | | | 711/147 |
| 2016/0050465 | A1* | 2/2016 | Zaheer | H04N 21/6581 |
| | | | | 725/34 |
| 2017/0118538 | A1* | 4/2017 | Ashbacher | H04N 21/8166 |
| 2017/0171335 | A1* | 6/2017 | Ao | H04L 67/26 |
| 2017/0171639 | A1* | 6/2017 | Bai | H04N 21/812 |
| 2017/0223426 | A1* | 8/2017 | Tulsi | H04N 21/814 |
| 2018/0020247 | A1* | 1/2018 | Zhang | G06Q 30/0241 |
| 2018/0279005 | A1* | 9/2018 | Grover | H04N 21/47217 |

FOREIGN PATENT DOCUMENTS

| | | |
|---|---|---|
| CN | 103780944 A | 5/2014 |
| CN | 104363484 A | 2/2015 |
| CN | 105427130 A | 3/2016 |
| CN | 105898446 A | 8/2016 |
| CN | 105959743 A | 9/2016 |
| CN | 106162259 A | 11/2016 |
| CN | 106228400 A | 12/2016 |
| WO | 2017101423 A1 | 6/2017 |

OTHER PUBLICATIONS

Extended European Search Report of counterpart European Patent Application No. 17917222.6 dated Nov. 28, 2019.

* cited by examiner

METHOD AND DEVICE FOR PUSHING ADVERTISEMENT, AND COMPUTER-READABLE STORAGE MEDIUM

TECHNICAL FIELD

The present disclosure relates to the field of video displaying technology, and more particularly relates to a method and a device for pushing advertisement, as well as a computer-readable storage medium.

BACKGROUND

Advertising is used for widely publicizing. Advertising is a propaganda mean to communicate information openly and widely to the public through certain forms of media and for a specific need. Advertisement has broad and narrow meanings. Broad advertisements include non-economic advertisements and economic advertisements. Non-economic advertisements refer to advertisements that do not aim at making profits, also known as effect advertisements, such as various announcements, notices, and statements of government administrative departments, social institutions and even individuals, the main purpose of which is to promote something. Narrow advertisements refer only to economic advertisements, also known as commercial advertisements, which refer to profit-making advertisement, which is an important way for communicating information between commodity producers, operators, and consumers, also is an important form for enterprises to occupy the market, sell products, and provide labor services, with the main purpose of expanding economic benefits. That is to say, advertising is a means of communication, and is an effective means of transmitting information about a certain commodity to a group of users and consumers from the production or operation of the commodity (advertiser). And an advertisement also enables users and consumers to quickly get useful information.

Advertisements are usually promoted through images or videos. These forms of advertisement simply show the advertisement content to the audience and cannot interact with the audience, i.e. it does not bring the audience into the actual application scenario of the advertisement content, thus failing to attract the attention of the audience, and not fully enabling the audience to understand the information that the advertisement wants to display, such as reflecting the characteristics of the product or promoting a certain policy, i.e., the user conversion rate is low.

SUMMARY

The main purpose of the disclosure is to provide a method and a device for pushing advertisement, as well as computer-readable storage medium, aiming at solving the technical problems that the traditional advertisement cannot interact with viewers and the conversion rate of users is low.

In order to achieve the above object, the present disclosure provides an advertisement pushing method. The advertisement pushing method is applied to an advertisement pushing system. The pushing system includes a terminal, a video management platform, and an advertising platform. The method includes the following steps:

The terminal sends a video acquisition request to the video management platform, the video management platform acquires a target video frame according to the video acquisition request, and sends the target video frame to the advertising platform;

The advertising platform correspondingly generates an advertisement according to the target video frame and sends auxiliary information corresponding to the advertisement to the video management platform;

The video management platform sends the auxiliary information and the target video frame to the terminal; and The terminal acquires the advertisement according to the auxiliary information, synthesizes the advertisement with the target video frame and plays a video corresponding to the synthesized target video frame.

Optionally, the operation of the terminal sends a video acquisition request to the video management platform, the video management platform acquires a target video frame according to the video acquisition request, and sends the target video frame to the advertising platform includes:

when receiving a video acquisition request sent by the terminal, the video management platform acquires terminal information of the terminal and determines whether the terminal information meets a preset video acquiring condition; and if the terminal information meets the video acquiring condition, the video management platform acquires a target video frame according to the video acquisition request and sends the target video frame to the advertising platform.

Optionally, the operation of if the terminal information meets the video acquiring condition, the video management platform acquires a target video frame according to the video acquisition request and sends the target video frame to the advertising platform includes:

if the terminal information meets the video acquiring condition, the video management platform acquires a terminal parameter in the video acquisition request; and acquiring a target video frame according to the video acquisition request and sending the target video frame to the advertising platform Optionally, the operation of the advertising platform correspondingly generates an advertisement according to the target video frame and sends auxiliary information corresponding to the advertisement to the video management platform includes:

the advertising platform correspondingly generates an advertisement according to the target video frame, and adjusts advertisement information and advertisement version number in the advertisement according to the terminal parameter; and Sending auxiliary information corresponding to the advertisement to the video management platform, wherein the auxiliary information comprises an advertisement name and a target address for storing the advertisement information and the advertisement version number.

Optionally, the operation of the advertising platform correspondingly generates an advertisement according to the target video frame and sends auxiliary information corresponding to the advertisement to the video management platform includes:

When receiving the target video frame, the advertising platform acquires characteristic information of the target video frame and correspondingly generates an advertisement according to the characteristic information.

Optionally, the operation of the terminal acquires the advertisement according to the auxiliary information, synthesizes the advertisement with the target video frame and plays a video corresponding to the synthesized target video frame includes:

the terminal analyzes the received auxiliary information to obtain the target address and the advertisement name in the auxiliary information;

the terminal generates an advertisement acquisition request according to the advertisement name and sends the advertisement acquisition request to the target address;

receiving the advertisement sent by the target address, wherein the advertisement comprises the advertisement information and the advertisement version number;

synthesizing the advertisement information and the target video frame and playing the video corresponding to the synthesized target video frame.

Optionally, prior to the operation of the terminal analyzes the received auxiliary information to obtain the target address and the advertisement name in the auxiliary information, the method further includes:

The terminal receives the target video frame sent by the video management platform and stores the target video frame in a preset video buffer area.

Optionally, the operation of the video management platform sends the auxiliary information and the target video frame to the terminal includes:

The video management platform generates an advertisement playing mark according to the acquisition time corresponding to the video acquisition request, and sends the advertisement playing mark, the auxiliary information and the target video frame to the terminal.

In addition, in order to achieve the above object, the present disclosure also provides an advertisement pushing device, which includes a processor, a memory and an advertisement pushing method program stored in the memory and operable on the processor, wherein when the advertisement pushing program is executed by the processor, the steps of the advertisement pushing method described in any one of the above are realized.

In addition, in order to achieve the above object, the present disclosure also provides a computer-readable storage medium on which an advertisement pushing program is stored, and when the advertisement pushing program is executed by a processor, the steps of the advertisement pushing method as described in any one of the above are implemented.

The present application provides an advertisement pushing method, which is applied to an advertisement pushing system. The pushing system comprises a terminal, a video management platform and an advertising platform. The method for pushing advertisement includes following operations. The terminal sends a video acquisition request to the video management platform, the video management platform acquires a target video frame according to the video acquisition request, and sends the target video frame to the advertising platform; the advertising platform correspondingly generates an advertisement according to the target video frame and sends auxiliary information corresponding to the advertisement to the video management platform; the video management platform sends the auxiliary information and the target video frame to the terminal; And the terminal acquires the advertisement according to the auxiliary information, synthesizes the advertisement with the target video frame and plays a video corresponding to the synthesized target video frame. In the above manner, the advertising platform generates corresponding advertisements according to the target video frames sent by the video management platform, the terminal acquires the advertisements according to the target address, synthesizes the target video frames sent by the video management platform with the advertisements, and plays the videos corresponding to the synthesized target video frames. The advertising platform generates the corresponding advertisement according to the target video frame, and sends the information such as the target address and the target video frame stored in the advertisement to the terminal through the video service platform; the terminal acquires the target video including the advertisement for playing. This application realizes the promotion of the advertisement content when playing the video content, associates the played advertisement with the currently played video frame, and brings the viewer into the actual application scene of the advertisement display content, which not only greatly enhances the attraction of the advertisement, but also causes the advertisement to interact with the viewer, simultaneously increases the user conversion rate, and solves the technical problems that the traditional advertisement cannot interact with the viewer and the user conversion rate is low.

Various implementations, functional features, and advantages of this disclosure will now be described in further detail in connection with some illustrative embodiments and the accompanying drawings.

DESCRIPTION OF EMBODIMENTS

It should be understood that the specific embodiments described herein are only for the purpose of explaining the present application and are not intended to limit the present application.

The main idea of the scheme of the embodiment is that the pushing device of the advertisement sends a video acquisition request to the video management platform through the terminal, the video management platform acquires a target video frame according to the video acquisition request, and sends the target video frame to the advertising platform; the advertising platform generates corresponding advertisements according to the target video frames and sends auxiliary information corresponding to the advertisements to the video management platform; the video management platform sends the auxiliary information and the target video frame to the terminal; The terminal obtains the advertisement according to the auxiliary information, synthesizes the advertisement with the target video frame and plays the video corresponding to the synthesized target video frame to solve the technical problems that the traditional advertisement cannot interact with the audience and the conversion rate of users is low.

Figure 1:
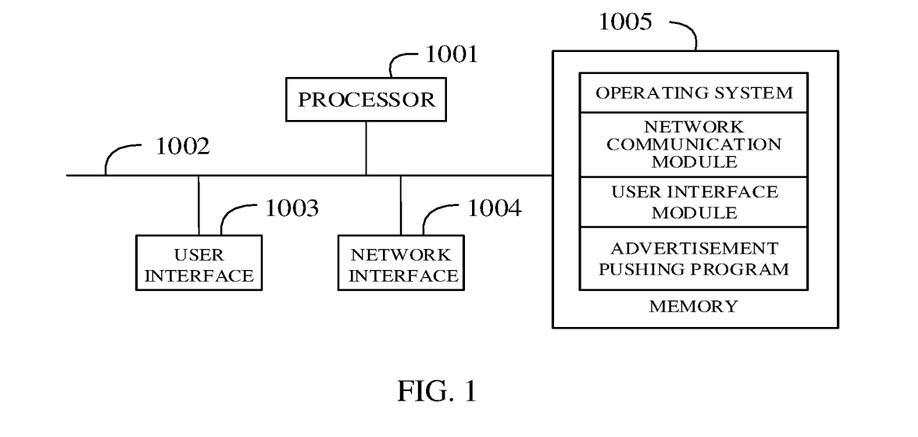
FIG. 1 is a schematic structural diagram of an execution terminal of an advertisement pushing method of an embodiment in accordance with this disclosure.

Referring to FIG. 1, FIG. 1 is a schematic structural diagram of an execution terminal of an advertisement pushing method of an embodiment in accordance with this disclosure.

The operation terminal of the embodiment of the invention may be a PC, or may be a mobile terminal device with display function such as a smart phone, a tablet computer, an e-book reader, a portable computer, etc.

As shown in FIG. 1, the terminal may include a processor 1001, such as a CPU, a communication bus 1002, user interface 1003, network interface 1004, and memory 1005. The communication bus 1002 is used to implement connection communication between these components. The user interface 1003 may include a display, an input unit such as a keyboard, and the optional user interface 1003 may also include a standard wired interface and a wireless interface. The network interface 1004 may optionally include a standard wired interface, a wireless interface (such as a Wi-Fi interface). The memory 1005 may be a high-speed RAM memory or a non-volatile memory, such as a magnetic disk memory. The memory 1005 may alternatively be a storage device independent of the aforementioned processor 1001.

It will be understood by those skilled in the art that the display panel structure shown in FIG. 1 does not constitute a definition of the display panel and may include more or fewer components than shown, or some components may be combined, or different part arrangements may be used.

With continued reference to FIG. 1, the memory 1005 in FIG. 1 as a storage medium may include an operating system, a network communication module, a user interface module, and an advertisement pushing program. Among them, the operating system is a program that manages and controls the push method device and software resources of advertisements, and supports the operation of the network communication module, the user interface module, the push method program of advertisements, and other programs or software. The network communication module is used to manage and control the network interface 1002. The user interface module is used to manage and control the user interface 1003.

In the terminal shown in FIG. 1, the network interface 1004 is mainly used to connect the cloud server and communicate data with the cloud server; the user interface 1003 may also connect to a client for data communication with the client. The processor 1001 and the memory 1005 in the present application may be provided in an advertisement pushing device, which invokes the advertisement pushing program stored in the memory 1005 through the processor 1001 and performs the following operations:

the terminal sends a video acquisition request to the video management platform, the video management platform acquires a target video frame according to the video acquisition request, and sends the target video frame to the advertising platform;

the advertising platform correspondingly generates an advertisement according to the target video frame and sends auxiliary information corresponding to the advertisement to the video management platform;

the video management platform sends the auxiliary information and the target video frame to the terminal; and the terminal acquires the advertisement according to the auxiliary information, synthesizes the advertisement with the target video frame and plays a video corresponding to the synthesized target video frame.

Further, the processor 1001 and the memory 1005 in the present application may be provided in an advertisement pushing device, which invokes the advertisement pushing program stored in the memory 1005 through the processor 1001 and performs the following operations:

when receiving a video acquisition request sent by the terminal, the video management platform acquires terminal information of the terminal and determines whether the terminal information meets a preset video acquiring condition; and if the terminal information meets the video acquiring condition, the video management platform acquires a target video frame according to the video acquisition request and sends the target video frame to the advertising platform.

Further, the processor 1001 and the memory 1005 in the present application may be provided in an advertisement pushing device, which invokes the advertisement pushing program stored in the memory 1005 through the processor 1001 and performs the following operations:

if the terminal information meets the video acquiring condition, the video management platform acquires a terminal parameter in the video acquisition request; and acquiring a target video frame according to the video acquisition request and sending the target video frame to the advertising platform.

Further, the processor 1001 and the memory 1005 in the present application may be provided in an advertisement pushing device, which invokes the advertisement pushing program stored in the memory 1005 through the processor 1001 and performs the following operations:

the advertising platform correspondingly generates an advertisement according to the target video frame, and adjusts advertisement information and advertisement version number in the advertisement according to the terminal parameter; and sending auxiliary information corresponding to the advertisement to the video management platform, wherein the auxiliary information comprises an advertisement name and a target address for storing the advertisement information and the advertisement version number.

Further, the processor 1001 and the memory 1005 in the present application may be provided in an advertisement pushing device, which invokes the advertisement pushing program stored in the memory 1005 through the processor 1001 and performs the following operations:

When receiving the target video frame, the advertising platform acquires characteristic information of the target video frame and correspondingly generates an advertisement according to the characteristic information.

Further, the processor 1001 and the memory 1005 in the present application may be provided in an advertisement pushing device, which invokes the advertisement pushing program stored in the memory 1005 through the processor 1001 and performs the following operations:

the terminal analyzes the received auxiliary information to obtain the target address and the advertisement name in the auxiliary information;

the terminal generates an advertisement acquisition request according to the advertisement name and sends the advertisement acquisition request to the target address;

receiving the advertisement sent by the target address, wherein the advertisement comprises the advertisement information and the advertisement version number;

synthesizing the advertisement information and the target video frame and playing the video corresponding to the synthesized target video frame.

Further, the processor 1001 and the memory 1005 in the present application may be provided in an advertisement pushing device, which invokes the advertisement pushing program stored in the memory 1005 through the processor 1001 and performs the following operations:

The terminal receives the target video frame sent by the video management platform and stores the target video frame in a preset video buffer area.

Further, the processor 1001 and the memory 1005 in the present application may be provided in an advertisement pushing device, which invokes the advertisement pushing program stored in the memory 1005 through the processor 1001 and performs the following operations:

The video management platform generates an advertisement playing mark according to the acquisition time corresponding to the video acquisition request, and sends the advertisement playing mark, the auxiliary information and the target video frame to the terminal.

Based on the above hardware structure, the embodiments of the advertisement pushing method of the present application are proposed.

Figure 2:
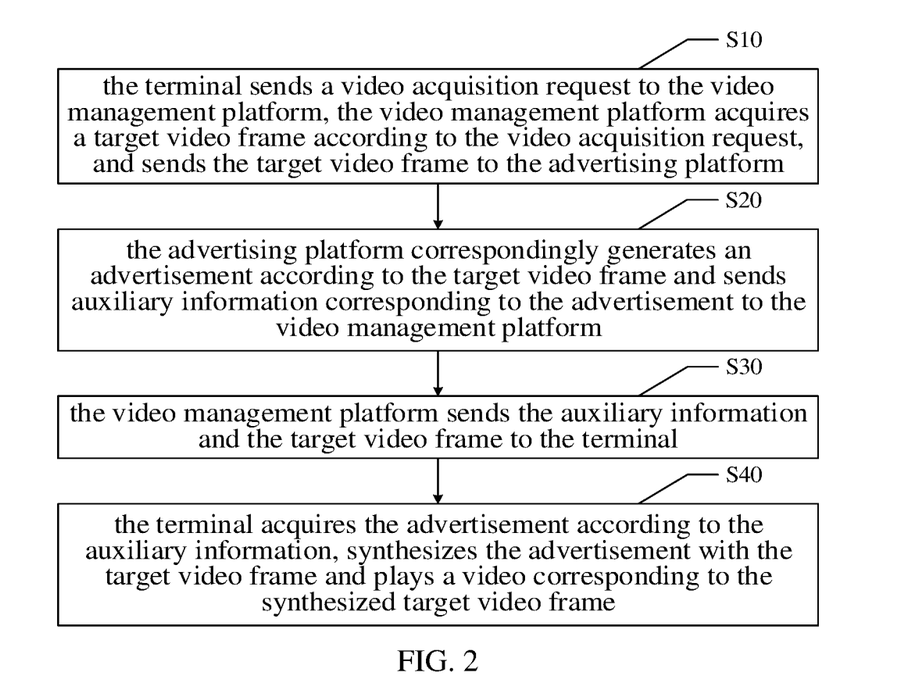
FIG. 2 is a flowchart of a method for pushing advertisement of the first embodiment in accordance with this disclosure.

Referring to FIG. 2, FIG. 2 is a flowchart of the first embodiment of the advertisement pushing method of the present application.

In this embodiment, the advertisement pushing method includes the following steps:

Step S10, the terminal sends a video acquisition request to the video management platform, the video management platform acquires a target video frame according to the video acquisition request, and sends the target video frame to the advertising platform.

In this embodiment, in order to solve the technical problems that the traditional advertisement cannot interact with the audience and the user conversion rate is low, the invention applies Augmented Reality (AR) technology to the advertisement field and combines the advertisement pushing method, i.e. the corresponding AR advertisement is generated in real time according to the target video frame to be played, so as to enhance the attraction of the advertisement, thereby causing the interaction between the audience and the advertisement, simultaneously increasing the user conversion rate, and solving the technical problems that the traditional advertisement cannot interact with the audience and the user conversion rate is low. The AR displaying is a technology that displays real image information and virtual image information on the same screen after superimposing them. It can greatly enhance the sense of experience and is one of the hottest and most important directions in the development of display technology. And AR can be widely used in games, advertising and other fields. In this embodiment, AR advertisements are created for the terminal and displayed through the flat terminal, which can leave a deep impression on the user, enhance the attractiveness of the advertisement and achieve the purpose of the advertisement. The advertisement pushing method is applied to an advertisement pushing system, and the pushing system includes a terminal, a video management platform and an AR advertising platform. The terminal is used for playing videos including an AR advertisement, the video management platform is used for feeding back a corresponding video to the terminal sending the video acquisition request, and the AR advertising platform is used for generating a corresponding AR advertisement according to the video to be played sent by the video management platform and sends the AR advertisement to the corresponding terminal for playing. Specifically, the terminal generates a corresponding video acquisition request according to information such as parameter information and terminal address information of the terminal and sends the video acquisition request to the video management platform. The video management platform acquires a target video frame matched with the video parameters in a local database or server according to the video parameters and other information included in the video acquisition request, and sends the target video frame to the AR advertising platform. In more embodiments, other techniques may also be used to increase the realism of advertisements.

Step S20, the advertising platform correspondingly generates an advertisement according to the target video frame and sends auxiliary information corresponding to the advertisement to the video management platform.

Specifically, when receiving the target video frame sent by the video management platform, the AR advertising platform extracts the characteristics of the target video frame, and then generates a corresponding AR advertisement according to the characteristics, the AR advertisement includes advertisement content and advertisement name, and assigns the corresponding advertisement version number to the AR advertisement. The AR advertisement is stored and auxiliary information such as target address, AR advertisement name and advertisement version number is sent to the video management platform.

Step S30, the video management platform sends the auxiliary information and the target video frame to the terminal.

Specifically, when the video management platform receives the auxiliary information corresponding to the AR advertisement sent by the AR advertising platform, it analyzes the auxiliary information to obtain the target address, advertisement name and advertisement version number of the AR advertisement.

Further, the video management platform generates an advertisement playing mark according to the acquisition time corresponding to the video acquisition request, and sends the advertisement playing mark, the auxiliary information and the target video frame to the terminal.

Specifically, the video management platform analyzes the video acquisition request, acquires the acquisition time in the video acquisition request, and generates an advertisement playing mark according to the acquisition time. The advertisement playing mark is used for the terminal to play AR advertisements according to the advertisement playing mark. The video management platform generates response information according to the target address, the advertisement name, the advertisement version number and the advertisement playing identifier, and feeds back the response information to the terminal according to the video acquisition request. In a specific embodiment, the video management platform can analyze the video acquisition request, acquire terminal address information in the video acquisition request, and send the response information to the corresponding terminal according to the terminal address information.

Step S40, the terminal acquires the advertisement according to the auxiliary information, synthesizes the advertisement with the target video frame and plays a video corresponding to the synthesized target video frame.

Specifically, when the terminal receives the auxiliary information sent by the video management platform, it analyzes the auxiliary information to obtain the target address and the target video frame in the auxiliary information, and sends an advertisement acquisition request to the target address and receives the AR advertisement sent from the target address. It also synthesizes the AR advertisement and the target video frame and playing the video corresponding to the synthesized target video frame. This video is the target video to be played including AR advertisements.

This embodiment provides an advertisement pushing method, which is applied to an advertisement pushing method system. The pushing system includes a terminal, a video management platform and an advertising platform. The terminal sends a video acquisition request to the video management platform, and the video management platform obtains a target video frame according to the video acquisition request and sends the target video frame to the advertising platform. The advertising platform generates corresponding advertisements according to the target video frames and sends auxiliary information corresponding to the advertisements to the video management platform; The video management platform sends the auxiliary information and the target video frame to the terminal; The terminal acquires the advertisement according to the auxiliary information, synthesizes the advertisement with the target video frame and plays the video corresponding to the synthesized target video frame. In the above manner, the advertising platform generates corresponding advertisements according to the target video frames sent by the video management platform, the terminal acquires the advertisements according to the target address, synthesizes the target video frames sent by the video management platform with the advertisements, and plays the videos corresponding to the synthesized target video frames. The advertising platform generates the corresponding advertisement according to the target video frame, and sends the information such as the target address and the target video frame stored in the advertisement to the terminal through the video service platform; the terminal acquires the target video including the advertisement for playing. The invention realizes the promotion of the advertisement content when playing the video content, associates the played advertisement with the currently played video frame, and brings the viewer into the actual application scene of the advertisement display content, which not only greatly enhances the attraction of the advertisement, but also causes the advertisement to interact with the viewer, simultaneously increases the user conversion rate, and solves the technical problems that the traditional advertisement cannot interact with the viewer and the user conversion rate is low.

Figure 3:
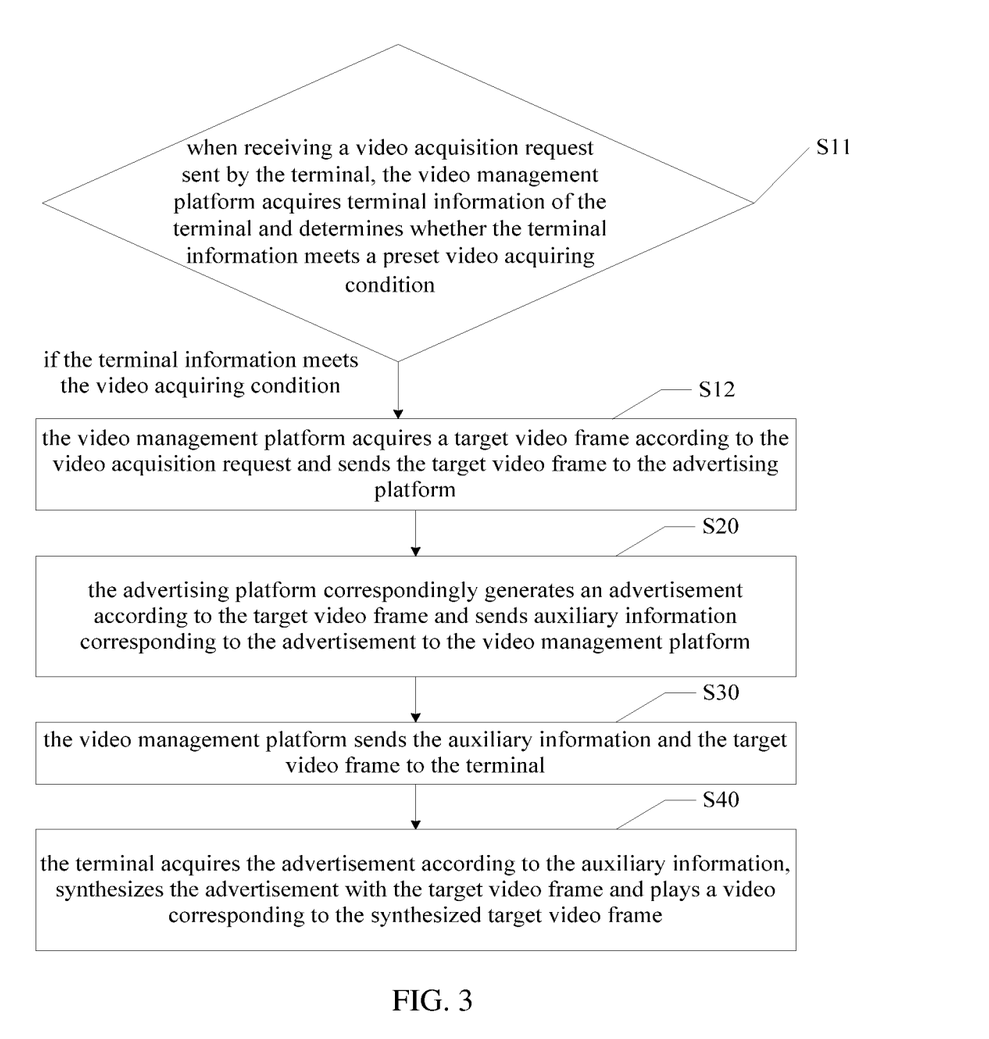
FIG. 3 is a flowchart of a method for pushing advertisement of the second embodiment in accordance with this disclosure.

Referring to FIG. 3, FIG. 3 is a flowchart of a method for pushing advertisement of the second embodiment in accordance with this disclosure.

In this embodiment, based on the above embodiment shown in FIG. 2, the step S10 further includes:

Step S11, when receiving a video acquisition request sent by the terminal, the video management platform acquires terminal information of the terminal and determines whether the terminal information meets a preset video acquiring condition.

Specifically, the video management platform acquires terminal information included in the video acquisition request when receiving the video acquisition request sent by the terminal, and judging whether the terminal information matches the legal terminal information data stored in the local database.

Step S12, if the terminal information meets the video acquiring condition, the video management platform acquires a target video frame according to the video acquisition request and sends the target video frame to the advertising platform.

Specifically, the terminal information matches the legal terminal information data stored in the local database, that is, the terminal information conforms to the video acquisition condition. The video management platform acquires the corresponding target video frame according to the video information included in the video acquisition request, and sends the target video frame to the AR advertising platform. In a specific embodiment, the terminal information does not match the legal terminal information data stored in the local database, that is, the terminal information does not meet the video acquisition conditions, and adding the terminal information into the legal terminal information data table in the local database to realize the registration of the terminal.

Step S121, if the terminal information meets the video acquiring condition, the video management platform acquires a terminal parameter in the video acquisition request.

Specifically, the terminal information matches the legal terminal information data stored in the local database, that is, the terminal information conforms to the video acquisition condition. The video management platform analyzes the video acquisition request, acquires terminal parameters in the video request, and sends the terminal parameters to the AR advertising platform.

Step S122, acquiring a target video frame according to the video acquisition request and sending the target video frame to the advertising platform.

Specifically, the video management platform acquires a target video frame according to video information in the video acquisition request and sends the target video frame to the AR advertising platform.

Further, the step S20 includes:

Step S21, the advertising platform correspondingly generates an advertisement according to the target video frame, and adjusts advertisement information and advertisement version number in the advertisement according to the terminal parameter.

Specifically, the AR advertising platform generates a corresponding AR advertisement according to the characteristics in the target video frame, and the AR advertisement is an AR advertisement matching the target of the product waiting for promotion included in the characteristics of the target video frame, and correspondingly adjusting the advertisement information and the advertisement version number in the AR advertisement according to the terminal parameters. For example, adjust the video size and definition of the advertisement according to the size of the terminal display screen parameters, and the advertisement version number suitable for the terminal corresponding to the terminal parameters.

Further, step S21 includes:

Step S211, when the advertising platform receives the target video frame, it acquires the characteristic information of the target video frame and generates the corresponding advertisement according to the characteristic information.

Specifically, when receiving the target video frame, the AR advertising platform acquires feature information in the target video frame according to preset feature acquisition rules, and generates corresponding AR advertisements according to the feature information, thereby associating the AR advertisement with a video corresponding to the target video frame.

Step S22, sending auxiliary information corresponding to the advertisement to the video management platform, wherein the auxiliary information comprises an advertisement name and a target address for storing the advertisement information and the advertisement version number.

Specifically, auxiliary information including a target address for storing the advertisement information and the advertisement version number and an advertisement name of the AR advertisement is sent to the video management platform.

Further, step S40 includes:

Step S41, the terminal analyzes the received auxiliary information to obtain the target address and the advertisement name in the auxiliary information.

Specifically, the terminal parses the received auxiliary information, and acquires the target address for storing the advertisement information and the advertisement version number and the advertisement name for acquiring the AR advertisement in the auxiliary information.

Step S42, the terminal generates an advertisement acquisition request according to the advertisement name and sends the advertisement acquisition request to the target address.

Specifically, the terminal generates an advertisement acquisition request according to the advertisement name of the advertisement and sends the advertisement acquisition request to a target address in the auxiliary information.

Step S43, receiving the advertisement sent by the target address, wherein the advertisement comprises the advertisement information and the advertisement version number.

Specifically, AR advertisements fed back by the target address according to the terminal address included in the advertisement acquisition request are received. The AR advertisement includes the advertisement information and the advertisement version number. The advertisement information includes the advertisement content of the AR advertisement, and the advertisement version number is a video version number suitable for playing by the terminal.

Step S44, synthesizing the advertisement information and the target video frame and playing the video corresponding to the synthesized target video frame.

Specifically, the advertisement information and the target video frame are combined, that is, the advertisement information and the target video frame are interleaved, rendered and virtualized to generate a combined video frame, and playing the video corresponding to the composite video frame, wherein the video is a target video including AR advertisements.

Further, before step S41, further includes:

Step S45, the terminal receives the target video frame sent by the video management platform and stores the target video frame in a preset video buffer area.

Specifically, when the terminal receives the target video frame fed back by the video management platform according to the video acquisition request, it allocates a video buffer area and stores the target video frame in the video buffer area. When receiving the AR advertisement fed back by the target address according to the advertisement acquisition request, allocating mixed access to the composite video, interleaving, rendering and virtualizing the advertisement information with the target video frame to generate the composite video frame. When the playing time corresponding to the advertisement playing mark is reached, the composite video frame is acquired for playing. The composite video frame is a composite frame of the target video frame and the AR advertisement. Therefore, the AR advertisement based on the target video frame can be played.

This application also provides a computer-readable storage medium.

The computer-readable storage medium of the present invention stores an advertisement pushing method program, which, when executed by a processor, implements the steps of the advertisement pushing method as described above.

Among them, the method implemented when the advertisement pushing method program is executed may refer to various embodiments of the advertisement pushing method of the present invention, and will not be described here.

It should be noted that in this document, the terms "comprising," "comprising," or any other variation thereof, are intended to cover a non-exclusive inclusion, such that a process, method, article, or system that includes a series of elements includes not only those elements but also other elements not expressly listed, or elements inherent to such process, method, article, or system. Without further limitation, the element defined by the statement "including one . . . " does not exclude the existence of another identical element in the process, method, article or system that includes the element.

The serial numbers of the above-mentioned embodiments of the present invention are for the purpose of description only and do not represent the advantages and disadvantages of the embodiments.

From the description of the above embodiments, it will be clear to those skilled in the art that the method of the above embodiments can be implemented by means of software plus the necessary general hardware platform, although it can also be implemented by hardware, but in many cases the former is a better embodiment. Based on this understanding, the technical solution of the present invention, in essence or as part of the contribution to the prior art, may be embodied in the form of a software product stored in a storage medium (such as rom/ram, magnetic disk, optical disk) as described above, including several instructions to cause a terminal device (which may be a mobile phone, computer, server, air conditioner, or network device, etc.) to perform the methods described in various embodiments of the present invention.

The foregoing description merely portrays some illustrative embodiments according to the disclosure and therefore is not intended to limit the patentable scope of the disclosure. Any equivalent structural or flow transformations that are made taking advantage of the specification and accompanying drawings of the disclosure and any direct or indirect applications thereof in other related technical fields shall all fall in the scope of protection of the disclosure.

What is claimed is:

1. A method for pushing advertisement, wherein the method is applied to a system for pushing advertisement, the system comprises a terminal, a video management platform, and an advertising platform, and the method comprises:
   when receiving a video acquisition request sent by the terminal, the video management platform acquires terminal information of the terminal and determines whether the terminal information meets a preset video acquiring condition;
   if the terminal information meets the video acquiring condition, the video management platform acquires a target video frame according to the video acquisition request and sends the target video frame to the advertising platform;
   the advertising platform correspondingly generates an advertisement according to the target video frame and sends auxiliary information corresponding to the advertisement to the video management platform;
   the video management platform sends the auxiliary information and the target video frame to the terminal; and
   the terminal acquires the advertisement according to the auxiliary information, synthesizes the advertisement with the target video frame and plays a video corresponding to the synthesized target video frame.

2. The method of claim 1, wherein the operation of that if the terminal information meets the video acquiring condition, the video management platform acquires a target video frame according to the video acquisition request and sends the target video frame to the advertising platform, comprises:
   if the terminal information meets the video acquiring condition, the video management platform acquires a terminal parameter in the video acquisition request; and
   acquiring the target video frame according to the video acquisition request and sending the target video frame to the advertising platform.

3. The method of claim 2, wherein the operation of that the advertising platform correspondingly generates an advertisement according to the target video frame and sends auxiliary information corresponding to the advertisement to the video management platform, comprises:

the advertising platform correspondingly generates an advertisement according to the target video frame, and adjusts advertisement information and advertisement version number in the advertisement according to the terminal parameter; and sending auxiliary information corresponding to the advertisement to the video management platform, wherein the auxiliary information comprises an advertisement name and a target address for storing the advertisement information and the advertisement version number.

4. The method of claim 3, wherein the operation of that the terminal acquires the advertisement according to the auxiliary information, synthesizes the advertisement with the target video frame and plays a video corresponding to the synthesized target video frame, comprises:

the terminal analyzes the received auxiliary information to obtain the target address and the advertisement name in the auxiliary information;

the terminal generates an advertisement acquisition request according to the advertisement name and sends the advertisement acquisition request to the target address;

receiving the advertisement sent by the target address, wherein the advertisement comprises the advertisement information and the advertisement version number;

synthesizing the advertisement information and the target video frame and playing the video corresponding to the synthesized target video frame.

5. The method of claim 4, prior to the operation of that the terminal analyzes the received auxiliary information to obtain the target address and the advertisement name in the auxiliary information, the method further comprises:

the terminal receives the target video frame sent by the video management platform and stores the target video frame in a preset video buffer area.

6. The method of claim 1, wherein the operation of that the advertising platform correspondingly generates an advertisement according to the target video frame and sends auxiliary information corresponding to the advertisement to the video management platform, comprises:

when receiving the target video frame, the advertising platform acquires characteristic information of the target video frame and correspondingly generates an advertisement according to the characteristic information.

7. The method of claim 1, wherein the operation of that the video management platform sends the auxiliary information and the target video frame to the terminal comprises:

the video management platform generates an advertisement playing mark according to the acquisition time corresponding to the video acquisition request, and sends the advertisement playing mark, the auxiliary information, and the target video frame to the terminal.

8. A device for pushing advertisement, wherein the device comprises a processor, a memory, and an advertisement pushing program stored in the memory and executable on the processor, wherein when be executed by the processor the program implements the operations:

when receiving a video acquisition request sent by a terminal, a video management platform acquires terminal information of the terminal and determines whether the terminal information meets a preset video acquiring condition;

if the terminal information meets the video acquiring condition, the video management platform acquires a target video frame according to the video acquisition request and sends the target video frame to an advertising platform;

the advertising platform correspondingly generates an advertisement according to the target video frame and sends auxiliary information corresponding to the advertisement to the video management platform;

the video management platform sends the auxiliary information and the target video frame to the terminal; and the terminal acquires the advertisement according to the auxiliary information, synthesizes the advertisement with the target video frame and plays a video corresponding to the synthesized target video frame.

9. A non-transitory computer-readable storage medium, wherein an advertisement pushing program is stored in the non-transitory computer-readable storage medium, and when be executed by the processor the program implements the operations:

when receiving a video acquisition request sent by a terminal, the video management platform acquires terminal information of the terminal and determines whether the terminal information meets a preset video acquiring condition;

if the terminal information meets the video acquiring condition, a video management platform acquires a target video frame according to the video acquisition request and sends the target video frame to an advertising platform;

the advertising platform correspondingly generates an advertisement according to the target video frame and sends auxiliary information corresponding to the advertisement to the video management platform;

the video management platform sends the auxiliary information and the target video frame to the terminal; and the terminal acquires the advertisement according to the auxiliary information, synthesizes the advertisement with the target video frame and plays a video corresponding to the synthesized target video frame.

* * * * *